United States Patent
Smilovici et al.

(10) Patent No.: US 8,708,616 B2
(45) Date of Patent: Apr. 29, 2014

(54) ROTARY CUTTING TOOL AND REVERSIBLE CUTTING INSERT THEREFOR

(75) Inventors: Carol Smilovici, Nahariya (IL); Osama Atar, Yarka (IL)

(73) Assignee: Iscar, Ltd., Tefen (IL)

( * ) Notice: Subject to any disclaimer, the term of this patent is extended or adjusted under 35 U.S.C. 154(b) by 151 days.

(21) Appl. No.: 13/542,846

(22) Filed: Jul. 6, 2012

(65) Prior Publication Data

US 2014/0010605 A1    Jan. 9, 2014

(51) Int. Cl.
*B23C 5/02* (2006.01)
*B23B 27/16* (2006.01)

(52) U.S. Cl.
USPC .............................................. 407/113; 407/42

(58) Field of Classification Search
USPC .............................. 407/113, 114, 115, 116, 42
See application file for complete search history.

(56) References Cited

U.S. PATENT DOCUMENTS

| | | | | |
|---|---|---|---|---|
| 4,318,644 A | * | 3/1982 | Seidel | 407/114 |
| 4,359,300 A | * | 11/1982 | Hazra et al. | 407/114 |
| 4,411,565 A | * | 10/1983 | Hazra et al. | 407/114 |
| 4,618,296 A | * | 10/1986 | Allaire et al. | 407/42 |
| 7,241,082 B2 | | 7/2007 | Smilovici et al. | |
| 7,455,483 B2 | | 11/2008 | Koskinen | |
| 7,604,441 B2 | * | 10/2009 | Bhagath | 407/113 |
| 8,573,905 B2 | * | 11/2013 | Hecht | 407/113 |
| 2007/0003384 A1 | | 1/2007 | Smilovici et al. | |
| 2010/0202839 A1 | | 8/2010 | Fang et al. | |
| 2013/0004251 A1 | | 1/2013 | Hausmann et al. | |

OTHER PUBLICATIONS

International Search Report dated Oct. 8, 2013 issued in PCT counterpart application (No. PCT/IL2013/050492).

* cited by examiner

*Primary Examiner* — Will Fridie, Jr.
(74) *Attorney, Agent, or Firm* — Womble Carlyle

(57) ABSTRACT

In a rotary cutting tool used for milling operations, a reversible indexable cutting insert is removably secured in a cutting body. The cutting insert has two opposing end surfaces interconnected by a continuous peripheral surface, including three side surfaces alternating with three corner surfaces. The side and corner surfaces intersect with both end surfaces at side and corner edges, respectively, with each side edge having a major cutting edge, and each corner edge having a corner and minor cutting edge. Each major and minor cutting edge slopes away from first and second end points, respectively, of its mutually associated corner cutting edge, towards a median plane. A first imaginary straight line extending perpendicular to the median plane and intersecting any one of the corner cutting edges at any point along its length except the second end point, passes through the median plane inside an insert boundary line.

34 Claims, 5 Drawing Sheets

US 8,708,616 B2

ROTARY CUTTING TOOL AND REVERSIBLE CUTTING INSERT THEREFOR

FIELD OF THE INVENTION

The present invention relates to cutting inserts and cutting tools for use in metal cutting processes, in general, and to rotary cutting tools having reversible cutting inserts for milling operations, in particular.

BACKGROUND OF THE INVENTION

Within the field of rotary cutting tools used in milling operations, there are many examples of reversible cutting inserts being removably secured in a cutting body. In some instances, these cutting tools are configured to perform square shoulder milling operations.

U.S. Pat. No. 7,241,082 discloses a generally rectangular shaped double-sided indexable cutting insert having two major and two minor side surfaces connected to two opposing end surfaces, and a total of four major cutting edges. A primary 'reversed' relief surface adjacent each major cutting edge is inclined to a median plane of the cutting insert at an acute interior angle. The cutting insert is retained in the insert pocket of a milling cutter and configured to perform milling operations with a positive axial rake angle.

U.S. Pat. No. 7,455,483 discloses a trigon-shaped double-sided indexable cutting insert of 'negative' geometry having six edge surfaces connected to two opposing sides, and a total of six main cutting edges. The cutting insert is seated in the insert pocket of a milling tool and configured to cut perpendicular corners in a workpiece with a positive rake angle.

U.S. Pat. No. 7,604,441 discloses a square double-ended indexable cutting insert of 'negative' geometry having four side surfaces connected to two opposing end surfaces, and a total of eight primary cutting edges. The cutting insert is seated in the insert pocket of a milling cutter and configured to cut a true 90° shoulder in a workpiece with a positive axial rake angle. However, the depth of the shoulder is limited by the size of the insert and dependent on the length of the primary cutting edge.

SUMMARY OF THE INVENTION

In accordance with one aspect of the present invention, there is provided a reversible indexable cutting insert, comprising:
 opposing first and second end surfaces interconnected by a continuous peripheral surface, with a median plane located between the first and second end surfaces and intersecting the peripheral surface to form an insert boundary line, and an insert axis perpendicular to the median plane about which the cutting insert is indexable,
  the peripheral surface including at least three side surfaces alternating with at least three corner surfaces, with each corner surface having a corner bisector plane containing the insert axis, and
  the side and corner surfaces intersecting with both the first and second end surfaces at side and corner edges, respectively, with each side edge having a major cutting edge, and each corner edge having a corner and minor cutting edge,
 wherein, in a side view of the cutting insert, each major and minor cutting edge slopes away from first and second end points, respectively, of its mutually associated corner cutting edge, towards the median plane, and
 wherein a first imaginary straight line extending perpendicular to the median plane and intersecting any one of the corner cutting edges at any point along its length except the second end point, passes through the median plane inside the insert boundary line.

In accordance with another aspect of the invention, there is provided a cutting tool rotatable about a tool axis, comprising a cutting body having an insert receiving pocket, and at least one reversible indexable cutting insert of the sort described above removably secured in the insert receiving pocket.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
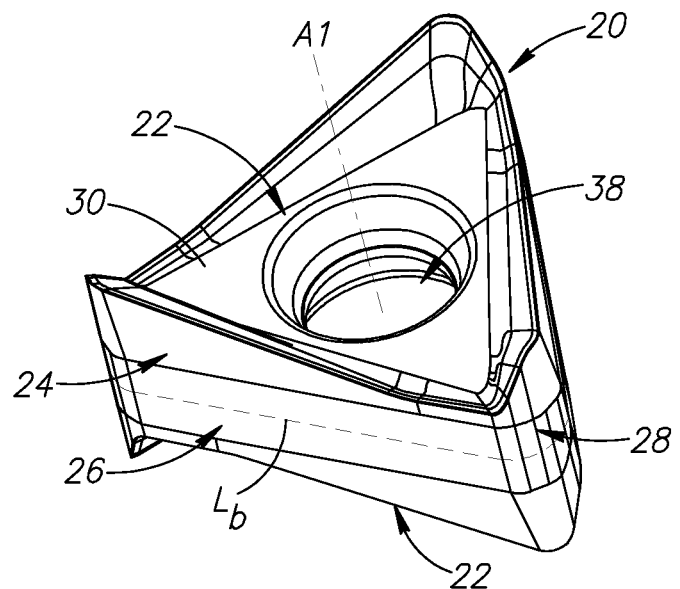
FIG. 1 is a perspective view of a cutting insert in accordance with some embodiments of the present invention.

The present invention relates to a reversible indexable cutting insert 20 having opposing first and second end surfaces 22 interconnected by a continuous peripheral surface 24, the peripheral surface 24 at least three side surfaces 26 alternating with at least three corner surfaces 28.

In some embodiments of the present invention, the at least three side surfaces 26 may be identical, and the at least three corner surfaces 28 may be identical.

Figure 2A:
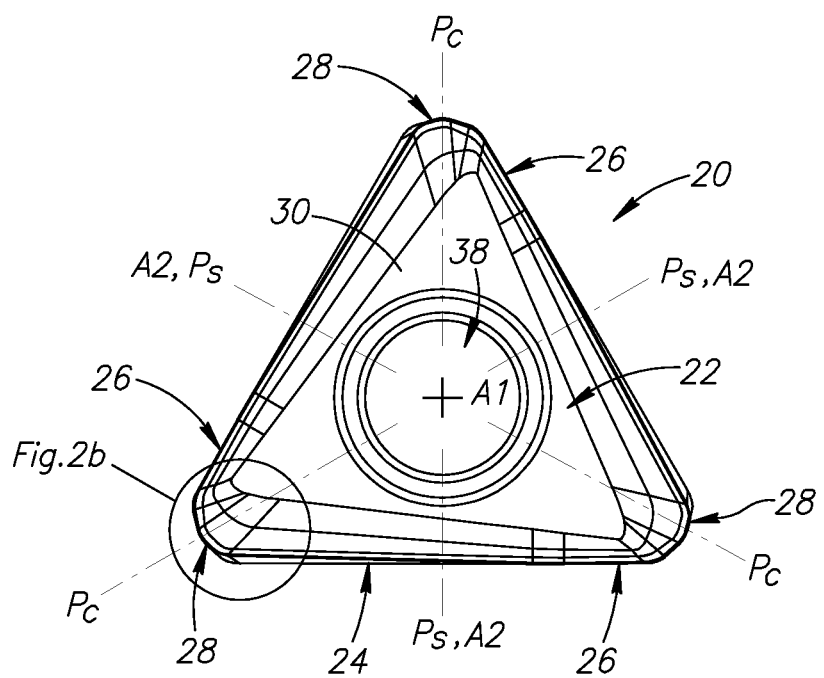
FIG. 2a is an end view of the cutting insert shown in FIG. 1.

As shown in FIGS. 1 and 2a, the cutting insert 20 may have the basic shape of a regular polygon.

In some embodiments of the present invention, the cutting insert 20 may preferably be manufactured by form pressing and sintering a cemented carbide, such as tungsten carbide, and may be coated or uncoated.

Figure 3:
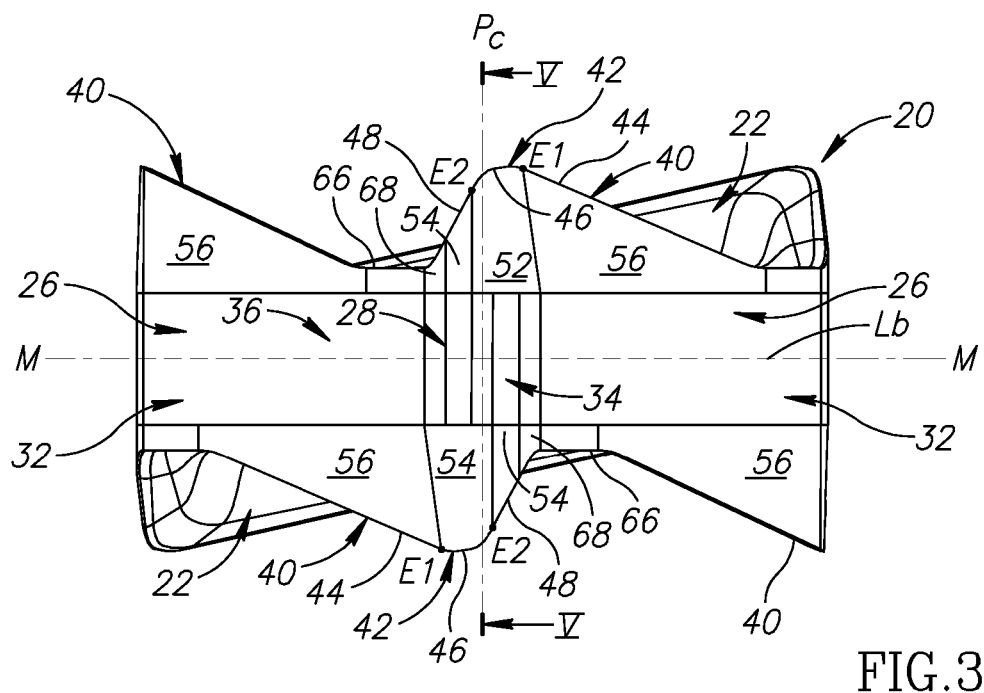
FIG. 3 is a side view of the cutting insert shown in FIG. 2a, viewed along a corner bisector plane Pc.
Figure 4:
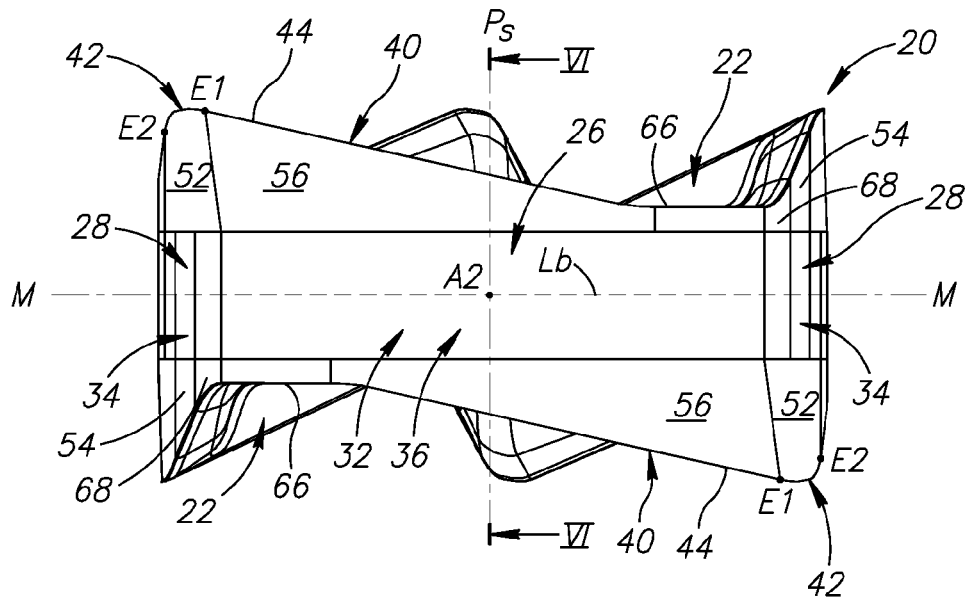
FIG. 4 is a side view of the cutting insert shown in FIG. 2a, viewed along a side bisector plane Ps.

As shown in FIGS. 3 and 4, the cutting insert 20 has a median plane M located between the first and second end surfaces 22 and intersecting the peripheral surface 24 to form an insert boundary line Lb.

In some embodiments of the present invention, the first and second end surfaces 22 may be identical, each having a support surface 30 substantially parallel to the median plane M.

Also, in some embodiments of the present invention, the two support surfaces 30 may be equidistant from the median plane M.

As shown in FIGS. 3 and 4, the at least three side and corner surfaces 26, 28 may have side and corner median regions 32, 34, respectively, forming a continuous peripheral median region 36 extending perpendicular to the median plane M.

Throughout the description, it should be appreciated that the perpendicularity of the peripheral median region 36 with respect to the median plane M has a manufacturing tolerance of 0.5°.

In some embodiments of the present invention, the peripheral median region 36 may exhibit mirror symmetry about the median plane M.

Also, in some embodiments of the present invention, each side median region 32 may be planar.

As shown in FIGS. 1 and 2a, the cutting insert 20 has an insert axis A1 perpendicular to the median plane M about which the cutting insert 20 is indexable.

In some embodiments of the present invention, the peripheral surface 24 may have exactly three side surfaces 26 alternating with exactly three corner surfaces 28, and the cutting insert 20 may exhibit three-fold rotational symmetry about the insert axis A1.

Also in some embodiments of the present invention, a through bore 38 coaxial with the insert axis A1 may extend between and open out at both the first and second end surfaces 22.

As shown in FIGS. 1 and 2a, the cutting insert 20 may have the basic shape of an equilateral triangle.

In some embodiments of the present invention, the cutting insert 20 may be manufactured by direct pressing along the direction of the insert axis A1.

Also, in some embodiments of the present invention, the cutting insert 20 may be pressed into its final shape, and the peripheral surface 24 may be unground.

According to the present invention, the side and corner surfaces 26, 28 intersect with both the first and second end surfaces 22 at side and corner edges 40, 42, respectively, with each side edge 40 having a major cutting edge 44, and each corner edge 42 having a corner and minor cutting edge 46, 48.

Thus, the cutting insert 20 is advantageously configured with two major cutting edges 44 per side surface 26, and two corner and minor cutting edges 46, 48 per corner surface 28, and thus for embodiments exhibiting three-fold rotational symmetry about the insert axis A1, the cutting insert 20 has a total of six major, corner and minor cutting edges 44, 46, 48

Figure 2B:
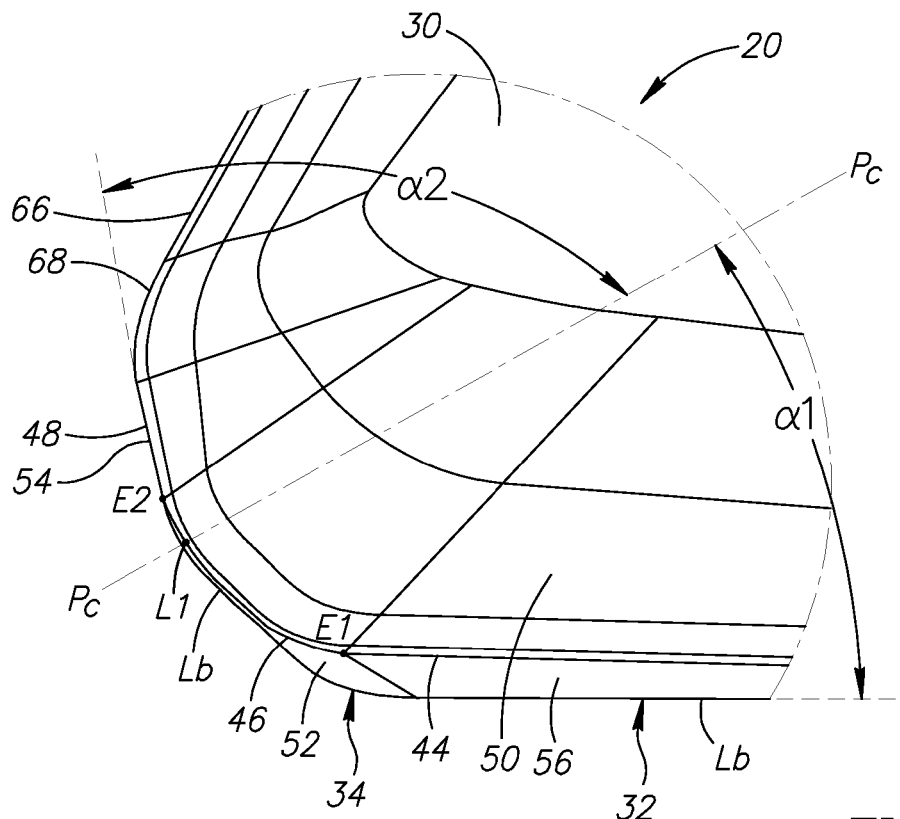
FIG. 2b is a detailed end view of the cutting insert shown in FIG. 1.

In an end view of the cutting insert 20, as shown in FIG. 2b, each corner cutting edge 46 may be curved while the minor and major cutting edges 44, 48 may be straight. Each curved corner cutting edge 46 extends between a first end point E1, where it merges with a substantially straight portion of its associated major cutting edge 44, and a second end point E2, where it merges with substantially straight portion of its associated minor cutting edge 48.

In a corner side view of the cutting insert 20, as shown in FIG. 3, each corner cutting edge 46 may again be curved while the minor and major cutting edges 44, 48 may again be straight.

As shown in FIG. 4, a side axis A2 may extend transversely to each side surface 26, and each side surface 26 may exhibit two-fold rotational symmetry about its associated side axis A2.

In some embodiments of the present invention, each major cutting edge 44 may intersect a side bisector plane Ps containing the insert axis A1 and its associated side axis A2. For these embodiments, it can be understood that each major cutting edge 44 extends along greater than half the peripheral length of its associated side surface 26.

According to the present invention, as shown in the corner side view of FIG. 3, each major and minor cutting edge 44, 48 slopes away from the first and second end points E1, E2, respectively, of its mutually associated corner cutting edge 46, towards the median plane M.

In some embodiments of the present invention, each major and minor cutting edge 44, 48 may slope away from its mutually associated corner cutting edge 46 towards the median plane M along its entire length.

Figure 5:
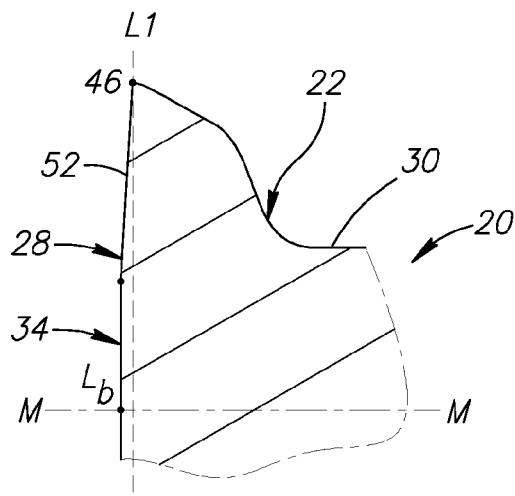
FIG. 5 is a partial cross-sectional view of the cutting insert shown in FIG. 3, taken along the line V-V.

Also, in some embodiments of the present invention, as shown in FIGS. 3 and 5, each corner cutting edge 46 may be entirely located further from the median plane M than each of the support surfaces 30.

Figure 6:
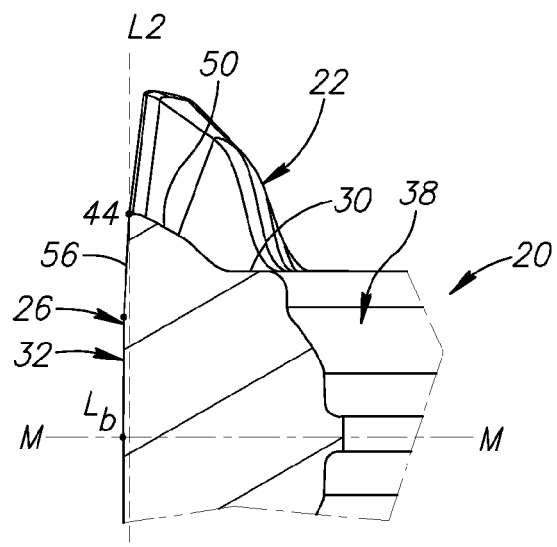
FIG. 6 is a partial cross-sectional view of the cutting insert shown in FIG. 4, taken along the line VI-VI.
Figure 7:
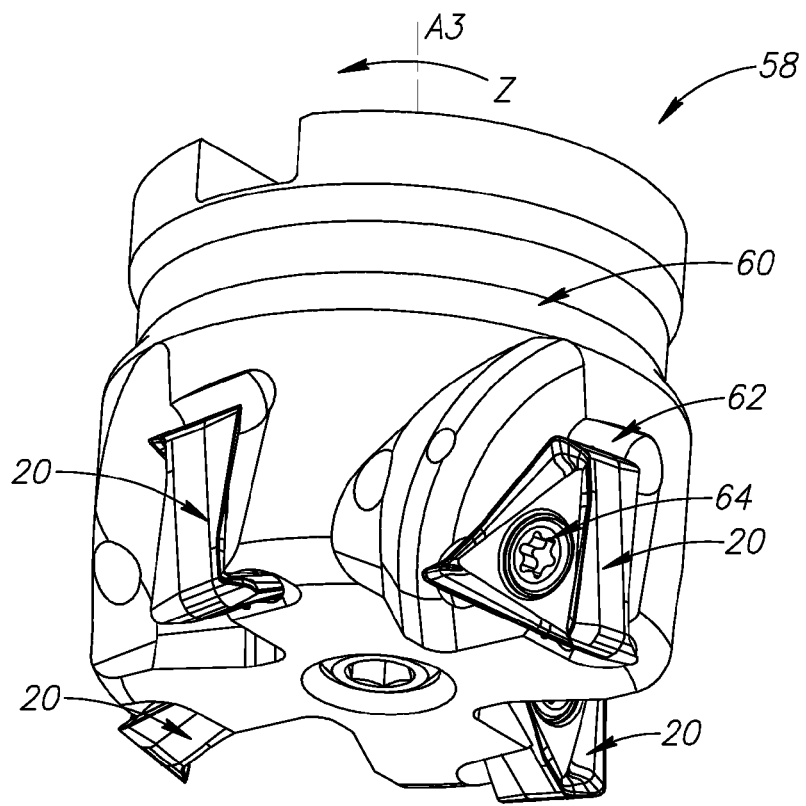
FIG. 7 is a perspective view of a cutting tool in accordance with some embodiments of the present invention.

Further, in some embodiments of the present invention, as shown in FIG. 6, each end surface 22 may include a rake surface 50 adjacent each major cutting edge 44, with each rake surface 50 inclined towards the median plane M and merging with its associated support surface 30.

As shown in FIGS. 2b and 5, a first imaginary straight line L1 extending perpendicular to the median plane M and intersecting any one of the corner cutting edges 46 at any point along its length except the second end point E2, passes through the median plane M inside the insert boundary line Lb.

It should be appreciated that the first imaginary straight line L1 appears as a point in an end view of the cutting insert 20, as shown in FIG. 2b.

In a similar vein, as can be surmised from FIGS. 1, 2a and 2b, in an end view projection of the minor cutting edges 48 onto the median plane M, (projection not shown) each minor cutting edge 48 may be coincident with the insert boundary line Lb.

In some embodiments of the present invention, as shown in FIG. 3, each corner surface 28 may include two partially conical shaped corner relief surfaces 52 extending from the same corner median region 34 in opposite axial directions to their respective corner cutting edges 46. As seen in the corner side view of FIG. 3, the two partially conical shaped corner relief surfaces 52 may overlap in the axial direction of the cutting insert 20.

It should be appreciated that with respect to the insert boundary line Lb, each partially conical shaped corner relief surface 52, also known as a 'reversed' relief surface, generally extends inwardly (i.e., in a direction of the insert axis A1) from its associated corner median region 34 towards its respective corner cutting edge 46, so that each corner cutting edge 46 is beneficially supported and advantageously robust.

In some embodiments of the present invention, as shown in FIG. 3, each corner surface 28 may include two planar minor relief surfaces 54 extending from the same corner median region 34 in opposite axial directions to their respective minor cutting edges 48. As seen in the corner side view of FIG. 3, the two planar minor relief surfaces 54 may not overlap in the axial direction of the cutting insert 20.

Also, in some embodiments of the present invention, each minor relief surface 54 may be perpendicular to the median plane M.

Further, in some embodiments of the present invention, each minor relief surface 54 may be spaced apart from its adjacent side surface 26 by a non-planar joining surface 68.

According to the present invention, as shown in FIG. 2a, each corner surface 28 has a corner bisector plane Pc containing the insert axis A1.

In some embodiments of the present invention, each corner cutting edge 46 may intersect its associated corner bisector plane Pc, and its first and second end points E1, E2 may be located on opposite sides of the corner bisector plane Pc.

However, as seen in the corner side view of FIG. 3, the corner bisector plane Pc may not pass through the highest point of the corner cutting edge 46. Also, as seen in the enlarged end view of FIG. 2b, the corner bisector plane Pc may not bisect the corner cutting edge 46 (i.e., need not pass mid-way between its first and second end points E1, E2.)

Also, in some embodiments of the present invention, as shown in FIG. 3, each corner median region 34 may exhibit mirror symmetry about its associated corner bisector plane Pc.

Further, for embodiments of the present invention having planar side median regions 32 perpendicular to the median plane M, each side median region 32 may form a first bisector angle $\alpha 1$ with the corner bisector plane Pc of an adjacent corner surface 28, having a value of 30°.

Yet further, for embodiments of the present invention having planar minor relief surfaces 54 perpendicular to the median plane M, each minor relief surface 54 may form a second bisector angle $\alpha 2$ with its associated corner bisector plane Pc, having a value of between 60° and 80°.

As shown in FIG. 6, a second imaginary straight line L2 extending perpendicular to the median plane M and intersecting any one of the major cutting edges 44 at any point along its length, may pass through the median plane M inside the insert boundary line Lb.

In some embodiments of the present invention, as shown in FIG. 4, each side surface 26 may include two major relief surfaces 56 extending from the same side median region 32 to their respective major cutting edges 44.

Further, in some embodiments of the present invention, each major cutting edge 44 may be substantially straight along its entire length, and each major relief surface 56 may be substantially planar.

It should be appreciated that with respect to the insert boundary line Lb, each major relief surface 56, also known as a 'reversed' relief surface, generally extends inwardly (i.e., in a direction of the insert axis A1) from its associated side median region 32 towards its respective major cutting edge 44, so that each major cutting edge 44 is beneficially supported and advantageously robust.

As shown in FIGS. 7 to 10, the present invention also relates to a cutting tool 58 rotatable about a tool axis A3, in a direction of rotation Z, having a cutting body 60 and at least one of the aforementioned reversible indexable cutting inserts 20. Each cutting insert 20 is removably secured in an insert receiving pocket 62 of the cutting body 60.

In some embodiments of the present invention, each cutting insert 20 may be removably secured in the insert receiving pocket 62 by means of a clamping screw 64 passing through its through bore 38, and threadingly engaging a screw bore (not shown) in a seating surface (not shown) of the insert receiving pocket 62.

Figure 10:
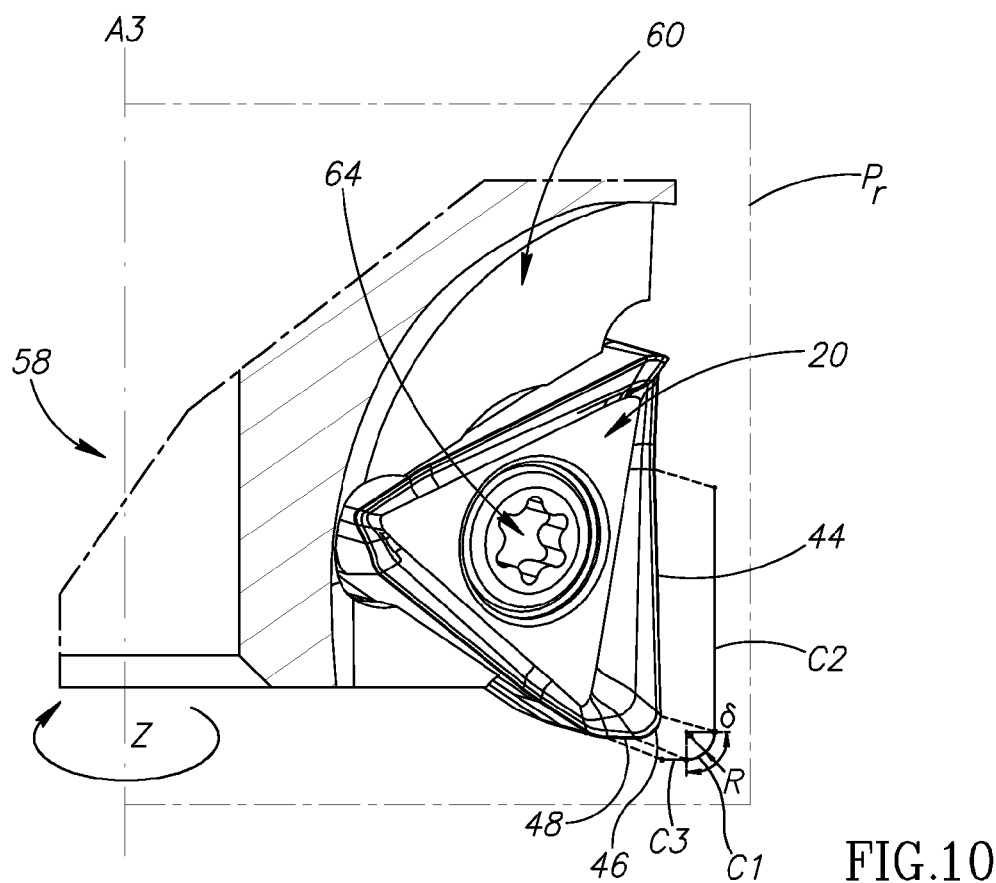
FIG. 10 is a diagrammatical representation of the contour lines inscribed by the operative cutting edges of the cutting tool shown in FIG. 9, in a radial plane Pr.

As shown in FIG. 10, each cutting insert 20 may be configured within the cutting tool 58 so that during rotation of the cutting tool 58 about its tool axis A3, the operative corner cutting edge 46 inscribes an arc-shaped first contour line C1 in a radial plane Pr containing the tool axis A3, with the first contour line C1 having a constant radius of curvature R subtending a corner cutting angle $\delta$ of 90°.

Also, as shown in FIG. 10, each cutting insert 20 may be configured within the cutting tool 58 so that during rotation of the cutting tool 58 about its tool axis A3, the operative major and minor cutting edges 44, 48 inscribe straight second and third contour lines C2, C3, respectively, in the radial plane Pr, with the second contour line C2 substantially parallel to the tool axis A3 and the third contour line C3 substantially perpendicular to the tool axis A3.

Throughout the description, it should be appreciated that the parallelity and perpendicularity of the second and third contour lines C2, C3, respectively, with respect to the tool axis A3 have an accuracy tolerance of 0.5°.

In some embodiments of the present invention, the rotary cutting tool 58 may be used for milling operations.

It should be appreciated that during a milling operation, the operative corner cutting edge 46 cuts a corner in a workpiece (not shown) having a constant radius of curvature R subtending a corner cutting angle $\delta$ of 90°, advantageously resulting in reduced stress concentrations at the corner, and thus minimizing its risk of fracture.

It should also be appreciated that during a milling operation, the operative minor cutting edge 48, which can also be referred to as a wiper, is parallel to the surface of the workpiece, promoting an even and smooth surface finish.

It should be further appreciated that during a milling operation, the major 'reversed' relief surfaces 56 beneficially provide the trailing non-operative major cutting edges 44 of each reversible cutting insert 20 with greater clearance from the workpiece, thus advantageously enabling their arrangement on relatively smaller diameter cutting tools 58.

In some embodiments of the present invention, as can be readily understood from FIG. 10, each cutting insert 20 may be configured within the cutting tool 58, so that the operative major, corner and minor cutting edges 44, 46, 48 perform a square, or 90°, shoulder milling operation in the workpiece.

It should be appreciated that during a square, or 90°, shoulder milling operation, the height of the machined shoulder is not limited by the cutting insert 20.

Figure 8:
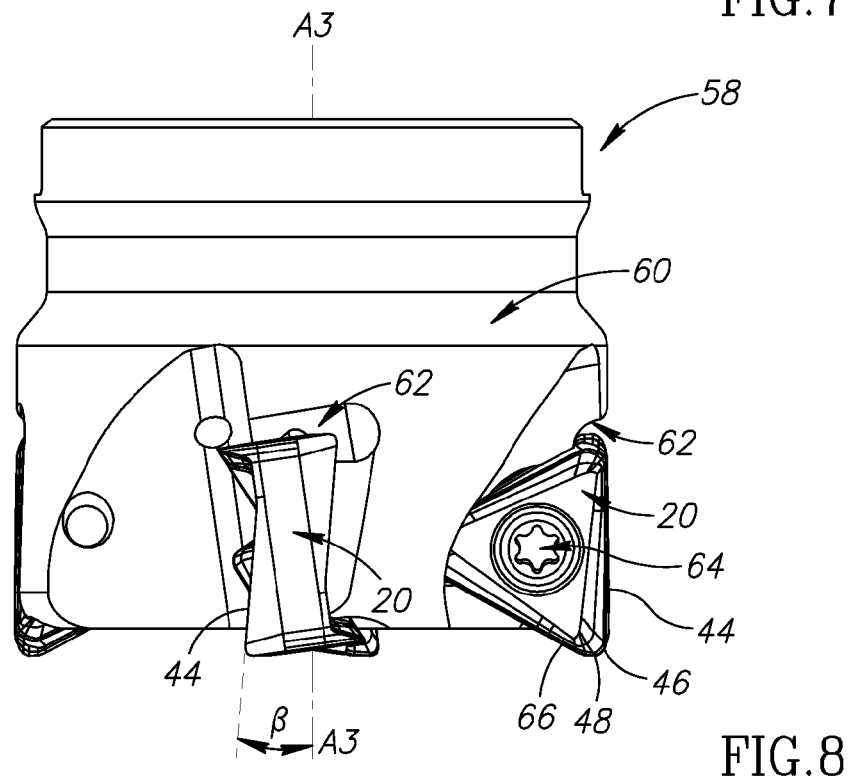
FIG. 8 is side view of the cutting tool shown in FIG. 7.
Figure 9:
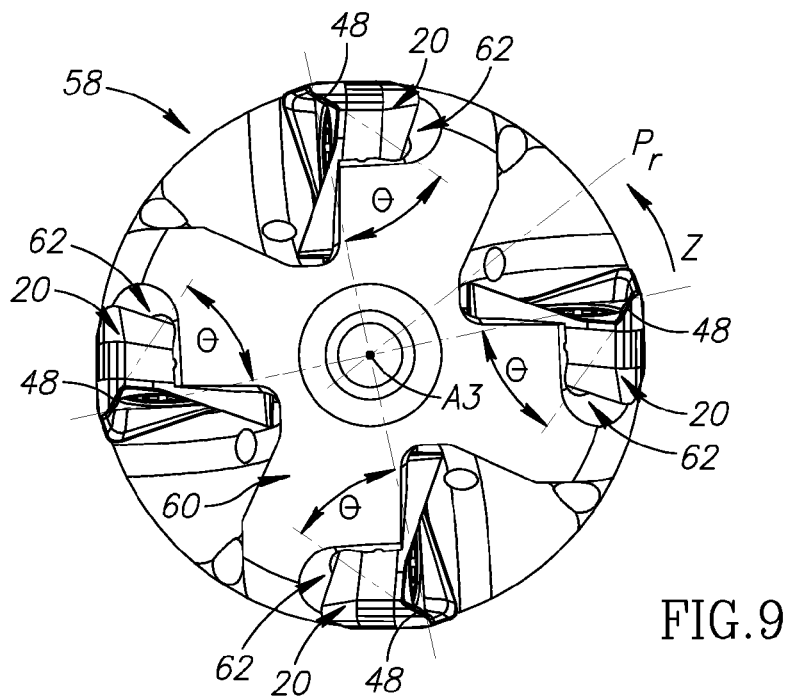
FIG. 9 is an end view of the cutting tool shown in FIG. 7.

In some embodiments of the present invention, as shown in FIGS. 8 and 9, each cutting insert 20 may be configured within the cutting tool 58, so that the operative major cutting edge 44 has a positive axial rake angle $\beta$, and the operative minor cutting edge 48 has a positive radial rake angle $\theta$.

It should be appreciated that by providing the operative major and minor cutting edges 44, 48 with positive axial and radial rake angles $\beta$, $\theta$, respectively, lower cutting forces are generated, the machine spindle requires less operating power, and the workpiece undergoes a smoother cutting action. Also the cutting chips produced are advantageously evacuated way from the operative cutting edges.

In some embodiments of the present invention, each side edge 40 may include an auxiliary cutting edge 66 extending from its associated major cutting edge 44 towards an adjacent minor cutting edge 48 belonging to an adjacent corner edge 42.

Each cutting insert 20 may be configured within the cutting tool 58, so that the auxiliary cutting edge 66 adjacent the operative minor cutting edge 48 is operative during ramping operations.

Each cutting insert 20 may also be configured within the cutting tool 58, so that the auxiliary cutting edge 66 extending from the operative major cutting edge 44 is operative during shoulder milling operations, thus increasing the insert's depth of cut.

As seen in the side views of FIGS. 3 and 4, the auxiliary cutting edge 66 may be sloped to a lesser extent than its associated major cutting edge 44. In some embodiments, the auxiliary cutting edge 66 may be parallel to the median plane M.

Also, in some embodiments of the present invention, each auxiliary cutting edge 66 may be substantially coplanar with its associated support surface 30.

Further, in some embodiments of the present invention, each end surface 22 may include an auxiliary rake groove (not shown) longitudinally extending adjacent each auxiliary cutting edge 66 to provide efficient chip evacuation during ramping operations.

Although the present invention has been described to a certain degree of particularity, it should be understood that various alterations and modifications could be made without departing from the spirit or scope of the invention as hereinafter claimed.

What is claimed is:

1. A reversible indexable cutting insert (20), comprising:
opposing first and second end surfaces (22) interconnected by a continuous peripheral surface (24), with a median plane (M) located between the first and second end surfaces (22) and intersecting the peripheral surface (24) to form an insert boundary line (Lb), and an insert axis (A1) perpendicular to the median plane (M) about which the cutting insert (20) is indexable,
the peripheral surface (24) including at least three side surfaces (26) alternating with at least three corner surfaces (28), with each corner surface (28) having a corner bisector plane (Pc) containing the insert axis (A1), and
the side and corner surfaces (26, 28) intersecting with both the first and second end surfaces (22) at side and corner edges (40, 42), respectively, with each side edge (40) having a major cutting edge (44), and each corner edge (42) having a corner and minor cutting edge (46, 48),
wherein, in a side view of the cutting insert (20), each major and minor cutting edge (44, 48) slopes away from first and second end points (E1, E2), respectively, of its mutually associated corner cutting edge (46), towards the median plane (M), and
wherein a first imaginary straight line (L1) extending perpendicular to the median plane (M) and intersecting any one of the corner cutting edges (46) at any point along its length except the second end point (E2), passes through the median plane (M) inside the insert boundary line (Lb).

2. The cutting insert (20) according to claim 1, wherein the at least three side and corner surfaces (26, 28) have side and corner median regions (32, 34), respectively, and
wherein the side and corner median regions (32, 34) form a continuous peripheral median region (36) extending perpendicular to the median plane (M).

3. The cutting insert (20) according to claim 2, wherein the peripheral median region (36) exhibits mirror symmetry about the median plane (M).

4. The cutting insert (20) according to claim 2, wherein each side median region (32) is planar.

5. The cutting insert (20) according to claim 4, wherein each side median region (32) forms a first bisector angle ($\alpha 1$) with the corner bisector plane (Pc) of an adjacent corner surface (28), and
wherein the first bisector angle ($\alpha 1$) is 30°.

6. The cutting insert (20) according to claim 2, wherein each corner median region (34) exhibits mirror symmetry about its associated corner bisector plane (Pc).

7. The cutting insert (20) according to claim 2, wherein each corner surface (28) includes two partially conical shaped corner relief surfaces (52) extending from the same corner median region (34) in opposite axial directions to their respective corner cutting edges (46).

8. The cutting insert (20) according to claim 2, wherein each corner surface (28) includes two planar minor relief surfaces (54) extending from the same corner median region (34) in opposite axial directions to their respective minor cutting edges (48).

9. The cutting insert (20) according to claim 8, wherein each minor relief surface (54) is spaced apart from its adjacent side surface (26) by a non-planar joining surface (68).

10. The cutting insert (20) according to claim 8, wherein each minor relief surface (54) is perpendicular to the median plane (M).

11. The cutting insert (20) according to claim 10, wherein each minor relief surface (54) forms a second bisector angle ($\alpha 2$) with its associated corner bisector plane (Pc), and
wherein the second bisector angle ($\alpha 2$) is between 60° and 80°.

12. The cutting insert (20) according to claim 1, wherein, in a side view of the cutting insert (20), each major and minor cutting edge (44, 48) slopes away from its mutually associated corner cutting edge (46) towards the median plane (M) along its entire length.

13. The cutting insert (20) according to claim 1, wherein the at least three side surfaces (26) are identical, and the at least three corner surfaces (28) are identical.

14. The cutting insert (20) according to claim 1, wherein each corner cutting edge (46) intersects its associated corner bisector plane (Pc), and
wherein its first and second end points (E1, E2) are located on opposite sides of the corner bisector plane (Pc).

15. The cutting insert (20) according to claim 1, wherein in an end view of the cutting insert (20), each corner cutting edge (46) is curved and each minor cutting edge (48) is straight.

16. The cutting insert (20) according to claim 1, wherein the first and second end surfaces (22) are identical, each having a support surface (30) substantially parallel to the median plane (M).

17. The cutting insert (20) according to claim 16, wherein the two support surfaces (30) are equidistant from the median plane (M).

18. The cutting insert (20) according to claim 16, wherein each corner cutting edge (46) is entirely located further from the median plane (M) than each of the support surfaces (30).

19. The cutting insert (20) according to claim 1, wherein a second imaginary straight line (L2) extending perpendicular to the median plane (M) and intersecting any one of the major cutting edges (44) at any point along its length, passes through the median plane (M) inside the insert boundary line (Lb).

20. The cutting insert (20) according to claim 1, wherein in an end view projection of the minor cutting edges (48) onto the median plane (M), each minor cutting edge (48) is coincident with the insert boundary line (Lb).

21. The cutting insert (20) according to claim 1, wherein the peripheral surface (24) has exactly three side surfaces (26) alternating with exactly three corner surfaces (28), and
wherein the cutting insert (20) exhibits three-fold rotational symmetry about the insert axis (A1).

22. The cutting insert (20) according to claim 1, wherein a side axis (A2) extends transversely to each side surface (26), and
wherein each side surface (26) exhibits two-fold rotational symmetry about its associated side axis (A2).

23. The cutting insert (20) according to claim 22, wherein each major cutting edge (44) intersects a side bisector plane (Ps) containing the insert axis (A1) and its associated side axis (A2).

24. The cutting insert (20) according to claim 1, wherein in an end view of the cutting insert (20), the cutting insert (20) has the basic shape of a regular polygon.

25. The cutting insert (20) according to claim 1, wherein in an end view of the cutting insert (20), the cutting insert (20) has the basic shape of an equilateral triangle.

26. The cutting insert (20) according to claim 1, wherein a through bore (38) coaxial with the insert axis (A1) extends between and opens out at both the first and second end surfaces (22).

27. The cutting insert (20) according to claim 1, wherein the cutting insert (20) is manufactured by direct pressing along the direction of the insert axis (A1).

28. The cutting insert (20) according to claim 1, wherein the peripheral surface (24) is unground.

29. A cutting tool (58) rotatable about a tool axis (A3), comprising a cutting body (60) and at least one reversible indexable cutting insert (20), each cutting insert (20) removably secured in an insert receiving pocket (62) of the cutting body (60), and each cutting insert (20) comprising:

opposing first and second end surfaces (22) interconnected by a continuous peripheral surface (24), with a median plane (M) located between the first and second end surfaces (22) and intersecting the peripheral surface (24) to form an insert boundary line (Lb), and an insert axis (A1) perpendicular to the median plane (M) about which the cutting insert (20) is indexable, the peripheral surface (24) including at least three side surfaces (26) alternating with at least three corner surfaces (28), with each corner surface (28) having a corner bisector plane (Pc) containing the insert axis (A1), and the side and corner surfaces (26, 28) intersecting with both the first and second end surfaces (22) at side and corner edges (40, 42), respectively, with each side edge (40) having a major cutting edge (44), and each corner edge (42) having a corner and minor cutting edge (46, 48), wherein, in a side view of the cutting insert (20), each major and minor cutting edge (44, 48) slopes away from first and second end points (E1, E2), respectively, of its mutually associated corner cutting edge (46), towards the median plane (M), and wherein a first imaginary straight line (L1) extending perpendicular to the median plane (M) and intersecting any one of the corner cutting edges (46) at any point along its length except the second end point (E2), passes through the median plane (M) inside the insert boundary line (Lb).

30. The cutting tool (58) according to claim 29, wherein each cutting insert (20) is configured so that the operative major, corner and minor cutting edges (44, 46, 48) are capable of performing a square shoulder milling operation in a workpiece.

31. The cutting tool (58) according to claim 29, wherein each side edge (40) includes an auxiliary cutting edge (66) extending from its associated major cutting edge (44) towards an adjacent minor cutting edge (48) belonging to an adjacent corner edge (42), and wherein each cutting insert (20) is configured so that the auxiliary cutting edge (66) adjacent the operative minor cutting edge (48) is operative during ramping operations.

32. The cutting tool (58) according to claim 29, wherein each cutting insert (20) is configured so that the operative major cutting edge (44) has a positive axial rake angle ($\beta$), and the operative minor cutting edge (48) has a positive radial rake angle ($\theta$).

33. The cutting tool (58) according to claim 29, wherein each cutting insert (20) is configured so that during rotation of the cutting tool (58) about its tool axis (A3), the operative corner cutting edge (46) inscribes an arc-shaped first contour line (C1) in a radial plane (Pr) containing the tool axis (A3), and wherein the first contour line (C1) has a constant radius of curvature (R) subtending a corner cutting angle ($\delta$) of 90°.

34. The cutting tool (58) according to claim 33, wherein each cutting insert (20) is configured so that during rotation of the cutting tool (58) about its tool axis (A3), the operative major and minor cutting edges (44, 48) inscribe straight second and third contour lines (C2, C3), respectively, in the radial plane (Pr), and wherein the second contour line (C2) is substantially parallel to the tool axis (A3), and wherein the third contour line (C3) is substantially perpendicular to the tool axis (A3).

\* \* \* \* \*